(12) United States Patent
Shikata et al.

(10) Patent No.: US 11,194,420 B2
(45) Date of Patent: Dec. 7, 2021

(54) DEVICE AND METHOD FOR PROXIMITY SENSING FOR DISPLAY PANEL HAVING A VARIABLE DISPLAY FRAME RATE

(71) Applicant: SYNAPTICS INCORPORATED, San Jose, CA (US)

(72) Inventors: Atsushi Shikata, Tokyo (JP); Shigeru Ota, Tokyo (JP); Makoto Takeuchi, Tokyo (JP); Jiro Shimbo, Tokyo (JP); Kentaro Suzuki, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/688,982

(22) Filed: Nov. 19, 2019

(65) Prior Publication Data

US 2021/0149540 A1    May 20, 2021

(51) Int. Cl.
*G06F 3/041* (2006.01)
*G09G 3/20* (2006.01)
*G06F 3/044* (2006.01)

(52) U.S. Cl.
CPC .......... *G06F 3/04166* (2019.05); *G09G 3/20* (2013.01); *G06F 3/044* (2013.01); *G09G 2310/08* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 2014/0210775 A1* | 7/2014 | Ota | G06F 3/04184 345/174 |
| 2015/0261356 A1* | 9/2015 | Shepelev | G06F 3/04162 345/174 |
| 2016/0077617 A1* | 3/2016 | Lee | G06F 3/044 345/173 |
| 2017/0315659 A1* | 11/2017 | Kuroiwa | G06F 3/04184 |
| 2018/0277034 A1* | 9/2018 | Kim | G09G 3/3225 |

* cited by examiner

*Primary Examiner* — Amr A Awad
*Assistant Examiner* — Donna V Bocar
(74) *Attorney, Agent, or Firm* — Leydig, Voit & Mayer, Ltd.

(57) ABSTRACT

A processing system comprises interface circuitry and a timing controller. The interface circuitry is configured to receive a vertical sync period indicator that indicates a start of an external vertical sync period. The timing controller is configured to, in response to a change in a display frame rate, control timing of a display drive operation and a proximity sensing operation to maintain a proximity sensing frame rate based on input timing of the vertical sync period indicator to the interface circuitry. The processing system is configured to supply drive signals to display elements of a display panel in the display drive operation and acquire sensing signals from sensor electrodes of the display panel in the proximity sensing operation.

22 Claims, 8 Drawing Sheets

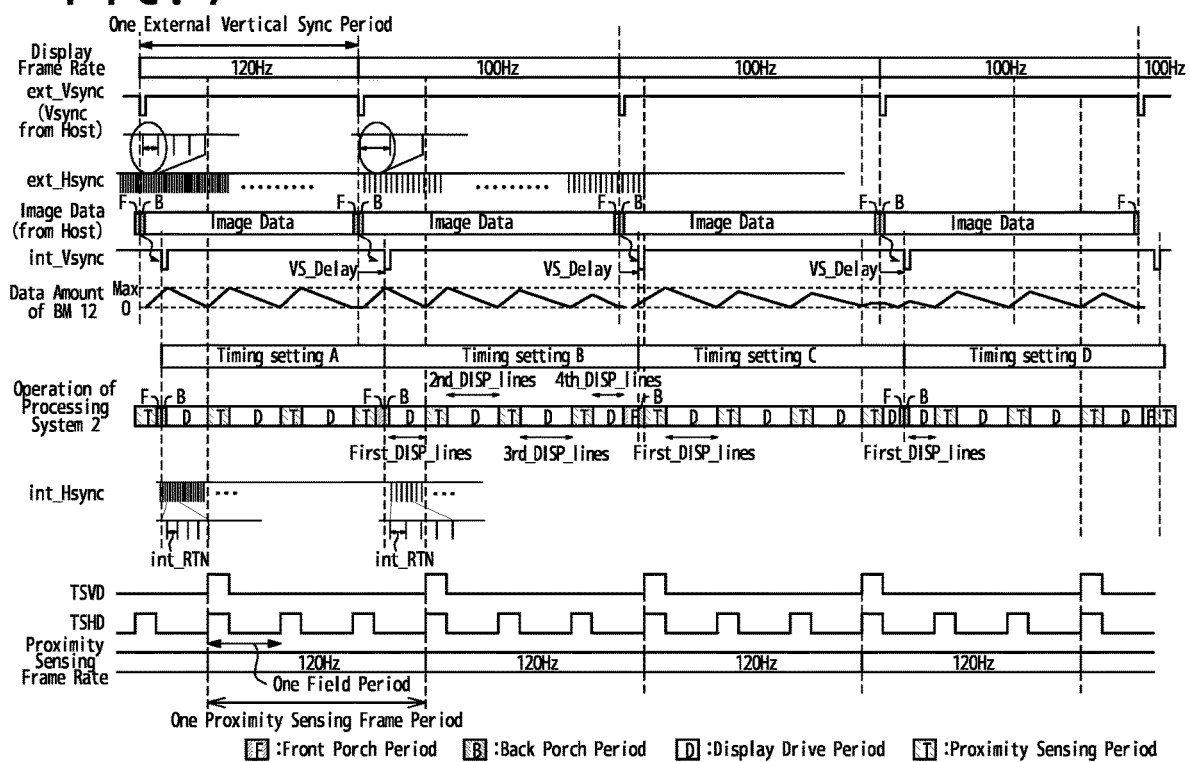

DEVICE AND METHOD FOR PROXIMITY SENSING FOR DISPLAY PANEL HAVING A VARIABLE DISPLAY FRAME RATE

BACKGROUND

Field

Embodiments disclosed herein generally relate to a device and method for proximity sensing for a display panel.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones.

SUMMARY

In one or more embodiments, a processing system comprises interface circuitry and a timing controller. The interface circuitry is configured to receive a vertical sync period indicator that indicates a start of an external vertical sync period. The timing controller is configured to, in response to a change in a display frame rate, control the timing of a display drive operation and a proximity sensing operation to maintain a proximity sensing frame rate based on input timing of the vertical sync period indicator to the interface circuitry. The processing system is configured to supply drive signals to display elements of a display panel in the display drive operation and acquire sensing signals from sensor electrodes of the display panel in the proximity sensing operation.

In one or more embodiments, a display system comprises a display panel and a processing system. The display panel comprises display elements and sensor electrodes. The processing system comprises interface circuitry and a timing controller. The interface circuitry is configured to receive a vertical sync period indicator that indicates a start of an external vertical sync period. The timing controller is configured to, in response to a change in a display frame rate, control timing of a display drive operation and a proximity sensing operation to maintain a proximity sensing frame rate based on input timing of the vertical sync period indicator. The processing system is configured to supply drive signals to display elements of a display panel in the display drive operation, and acquire sensing signals from sensor electrodes of the display panel in the proximity sensing operation.

In one or more embodiments, a method comprises receiving a vertical sync period indicator that indicates a start of an external vertical sync period by interface circuitry of a processing system, and in response to a change in a display frame rate, controlling timing of a display drive operation and a proximity sensing operation to maintain a proximity sensing frame rate based on input timing of the vertical sync period indicator to the interface circuitry. The display drive operation comprises supplying drive signals to display elements of a display panel. The proximity sensing operation comprises acquiring sensing signals from sensor electrodes of the display panel.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 7 illustrates an example operation of a display system, according to one or more embodiments.

Figure 1:
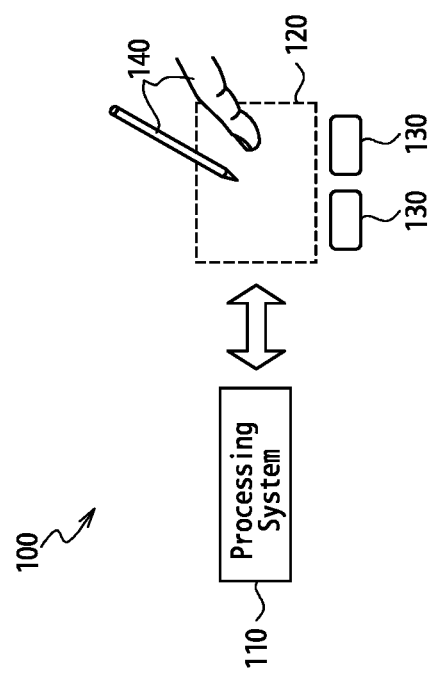
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device configured to sense input provided by one or more input objects 140 in a sensing region 120. Example input objects 140 include fingers and styli, as shown in FIG. 1. An exemplary proximity sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that comprises: no contact with any surfaces of the input device 100; contact with an input surface, e.g., a touch surface, of the input device 100: contact with an input surface of the input device 100 coupled with some amount of applied force or pressure; and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to minimize visible transmission loss from the display subpixels). Further, the sensor electrodes may be disposed over a display of a display device. The sensor electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and the cathode electrode). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, a modulated an input object (e.g., a powered active stylus) may be received by the orthogonal electrode axes without modulation of the corresponding electrodes (e.g., relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g., ITO, metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

A cathode electrode of an OLED display may provide a low impedance screen between one or more display electrodes and the sensor electrodes which may be separated by a thin encapsulation layer. For example, the encapsulation layer may be about 10 um. Alternatively, the encapsulation layer may be less than 10 um or greater than 10 um. Further, the encapsulation layer may be comprised of a pin hole free stack of conformal organic and inorganic dielectric layers.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
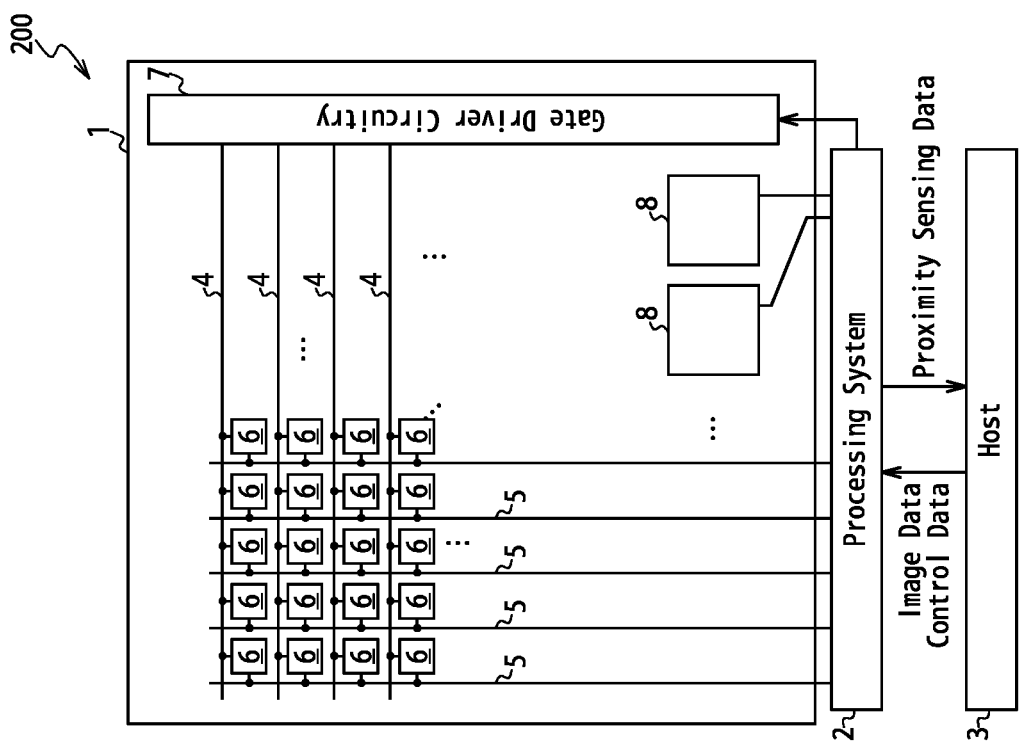
FIG. 2 illustrates an example configuration of a display system, according to one or more embodiments.

In one or more embodiments, as illustrated in FIG. 2, an input device 200 comprises a display panel 1, such as a liquid crystal display (LCD) panel and an organic light emitting diode (OLED) display panel, and a processing system 2. The input device 200 may be configured to display an image corresponding to image data received from a host 3. In one or more embodiments, the input device 200 may be additionally configured to perform proximity sensing to detect one or more of a contact or an approach of an input object, such as a user's finger and a stylus, to the display panel 1. The input device 200 may be used as an automotive user interface.

The display panel 1 may comprise gate lines 4, which may be also referred to as scan lines, source lines 5, which may be also referred to as data lines, display elements 6, and gate driver circuitry 7. The gate lines 4 may be driven by the gate driver circuitry 7. The source lines 5 may be connected to the processing system 2.

Each display element 6 may be disposed at an intersection of the corresponding gate line 4 and source line 5. The display elements 6 may each comprise a light-emitting element, a select transistor, and a hold capacitor when an OLED display panel is used as the display panel 1. The display elements 6 may each comprise a pixel electrode, a select transistor, and a hold capacitor when an LCD display panel is used as the display panel 1. The display panel 1 may comprise various interconnections other than the gate lines 4 and the source lines 5, depending on the configuration of the display elements 6.

In one or more embodiments, the display panel 1 additionally comprises sensor electrodes 8 used for capacitive proximity sensing. While two sensor electrodes 8 are shown, the display panel 1 may comprise more than two sensor electrodes 8. The sensor electrodes 8 may be disposed over the entirety of a sensing region (e.g., the sensing region 120) of the input device 200. Further, the size and shape of the sensor electrodes 8 may differ from what is shown in FIG. 2. Proximity sensing may comprise driving the sensor electrodes 8 for capacitive sensing to detect an input object, e.g., the input object 140, in the sensing region of the input device 200. Proximity sensing may be achieved through driving the sensor electrodes 8 for self-capacitance sensing or mutual capacitance sensing as described above with regard to FIG. 1. In one or more embodiments, the sensor electrodes 8 may be used for display updating and capacitive sensing. In embodiments where the display panel 1 is an LCD panel, the sensor electrodes 8 may be used as the common electrodes for display updating in addition to being driven for capacitive sensing. In embodiments where the display panel 1 additionally comprises transmitter electrodes (not illustrated), the proximity sensing may be based on the mutual capacitances, or transcapacitances, formed between the transmitter electrodes and the sensor electrodes 8.

Figure 3:
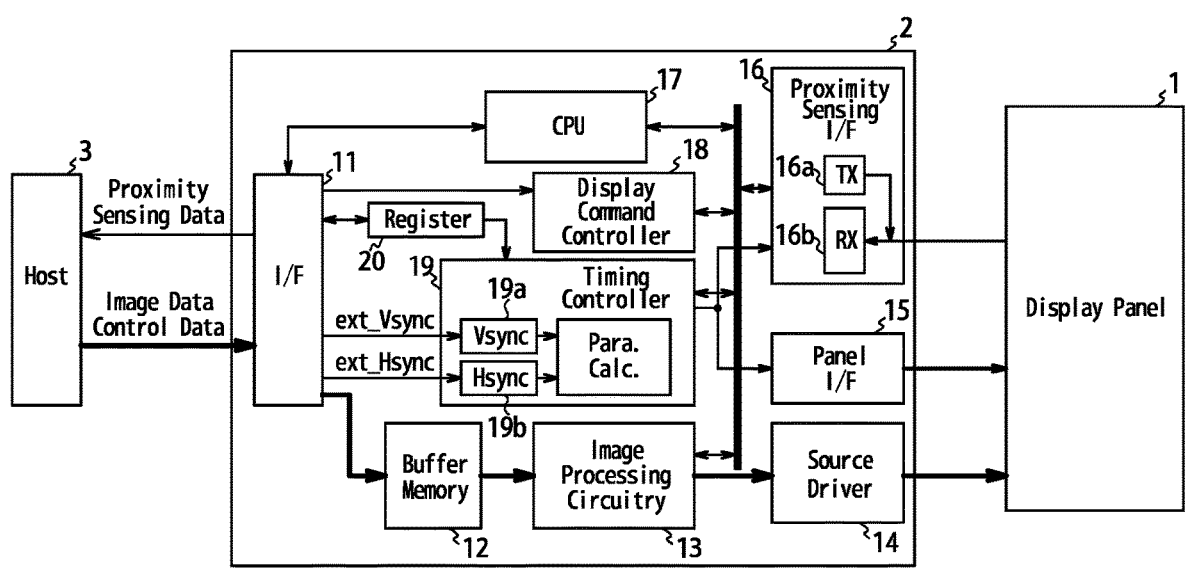
FIG. 3 illustrates an example configuration of a processing system, according to one or more embodiments.

The processing system 2 may comprise an IC chip configured for touch display driver integration (TDDI) such that the processing system 2 achieves driving of the display elements 6 and operating of the sensor electrodes 8 for capacitive sensing. In other embodiments, the processing system 2 may comprise a first IC chip configured to drive the display elements 6 for display updating and a second IC chip configured to operate the sensor electrodes 8 for capacitive sensing. In one or more embodiments, as illustrated in FIG. 3, the processing system 2 comprises interface circuitry 11, a buffer memory 12, image processing circuitry 13, source driver circuitry 14, panel interface circuitry 15, proximity sensing interface circuitry 16, a central processing unit (CPU) 17, a display command controller 18, a timing controller 19, and register circuitry 20.

The interface circuitry 11 may be configured to communicate with the host 3. The interface circuitry 11 may be configured to receive the image data from the host 3 and forward the received image data to the buffer memory 12. The interface circuitry 11 may be further configured to receive various control data such as control packets and commands for control of the processing system 2 from an external entity, system or device, for example, the host 3.

The control packets may comprise a packet for controlling the timing of the processing system 2. In one or more embodiments, the control packets comprise vertical sync (Vsync) packets. A Vsync packet may be used as a vertical sync period indicator that indicates a start of a vertical sync period in the host 3. Alternatively, a vertical sync signal may be supplied to the interface circuitry 11 from the host 3 in place of the Vsync packets. In such embodiments, the vertical sync signal may be used as the vertical sync period indicator. The interface circuitry 11 may be configured to generate an external vertical sync detection signal ext_Vsync based on the Vsync packets or the vertical sync signal.

In one or more embodiments, the control packets received from the host 3 comprise horizontal sync (Hsync) packets. A Hsync packet may be used as a horizontal sync period indicator which indicates a start of a horizontal sync period in the host 3. Alternatively, a horizontal sync signal may be supplied to the interface circuitry 11 from the host 3 in place of the Hsync packets. In such embodiments, the horizontal sync signal may be used as the horizontal sync period indicator. The interface circuitry 11 may be configured to generate an external horizontal sync detection signal ext_Hsync based on the Hsync packets or the horizontal sync signal.

In one or more embodiments, the buffer memory 12 is configured to receive the image data from the interface circuitry 11 and temporarily store therein the received image data. The image data stored in the buffer memory 12 may be read out at appropriate timing and supplied to the image processing circuitry 13.

The image processing circuitry 13 may be configured to perform desired image processing on the image data received from the buffer memory 12. The image processing circuitry 13 may be configured to supply the image data generated through this image processing to the source driver circuitry 14.

In one or more embodiments, the source driver circuitry 14 is configured as drive circuitry which drives the source lines 5 of the display panel 1 based on the image data received from the image processing circuitry 13. The source driver circuitry 14 may be configured to perform a digital-analog conversion on the image data received from the image processing circuitry 13 to generate the drive signals to be supplied to the respective source lines 5. The drive signals thus generated may be supplied to the respective display elements 6 via the source lines 5 to drive the display elements 6 of the display panel 1.

The panel interface circuitry 15 may be configured to supply gate control signals to the gate driver circuitry 7 of the display panel 1. In such embodiments, the gate driver circuitry 7 may be controlled based on the gate control signals received from the panel interface circuitry 15.

In one or more embodiments, the proximity sensing interface circuitry 16 is configured to generate capacitance detection data corresponding to capacitances of the sensor electrodes 8 disposed in the display panel 1. The proximity sensing interface circuitry 16 may comprise a transmitter 16a and a receiver 16b. When proximity sensing is achieved through self-capacitance sensing, the transmitter 16a may supply transmitter signals to the sensor electrodes 8 and the receiver 16b may receive sensing signals (which may be also referred to as resulting signals) outputted from the sensor electrodes 8 in response to the drive signals. When proximity sensing is achieved through mutual capacitance sensing, the transmitter 16a may supply drive signals to transmitter electrodes (not illustrated) disposed on the display panel 1 and the receiver 16b may receive sensing signals outputted from the sensor electrodes 8 in response to the drive signals. The sensing signals received by the receiver 16b may be subjected to an analog-digital conversion to generate the capacitance detection data.

In one or more embodiments, the CPU 17 is configured to perform data processing for the proximity sensing based on the capacitance detection data received from the proximity sensing interface circuitry 16 and generate proximity sensing data indicative of the result of the proximity sensing. The proximity sensing data thus generated may be transmitted to the host 3 via the interface circuitry 11.

The display command controller 18 may be configured to control the operation of the processing system 2 based on a command supplied from the host 3 to the processing system 2. The display command controller 18 may control circuitry of the processing system 2 related to the operation specified by the command.

In one or more embodiments, the timing controller 19 is configured to perform overall control of the timing of the processing system 2 based on the control data supplied from the host 3 to the processing system 2. The timing controller 19 may comprise a Vsync detector 19a and an Hsync detector 19b. In various embodiments, the Vsync detector 19a is configured to detect timing at which a vertical sync period indicator, such as a Vsync packet, is inputted to the processing system 2 from the host 3. The Vsync detector 19a may be configured to detect input timing of the vertical sync period indicator to the processing system 2 through monitoring the external vertical sync detection signal ext_Vsync, which is generated based on the vertical sync period indicator. In various embodiments, the Hsync detector 19b is configured to detect timing at which a horizontal sync period indicator, such as a Hsync packet, is inputted to the processing system 2 from the host 3. The Hsync detector 19b may be configured to detect input timing of the horizontal sync period indicator to the processing system 2 through monitoring the external horizontal sync detection signal ext_Hsync, which is generated based on the horizontal sync period indicator.

In one or more embodiments, the timing controller 19 is configured to generate, based on input timings of the vertical sync period indicator and the horizontal sync period indicator to the processing system 2, an internal vertical sync signal int_Vsync and an internal horizontal sync signal int_Hsync, which are internally used in the processing system 2. The timing controller 19 may be configured to assert the internal vertical sync period int_Vsync to start an internal vertical sync period and assert the internal horizontal sync period int_Hsync to start an internal horizontal sync period. When a Vsync packet and an Hsync packet are used as the vertical sync period indicator and the horizontal sync period indicator, respectively, the timing controller 19 may be configured to generate the internal vertical sync signal int_Vsync based on the input timing of the Vsync packet and generate the internal horizontal sync signal int_Hsync based on the input timing of the Hsync packet. In embodiments where a vertical sync signal and a horizontal sync signal are supplied from the host 3 as the vertical sync period indicator and the horizontal sync period indicator, respectively, the timing controller 19 may be configured to generate the internal vertical sync signal int_Vsync based on the assertion timing of the vertical sync signal and generate the internal horizontal sync signal int_Hsync based on the assertion timing of the horizontal sync signal.

In one or more embodiments, the timing controller 19 is further configured to obtain control parameters used for controls of a display drive operation and a proximity sensing operation and control the timing based on the obtained control parameters. The display driver operation may involve supplying drive signals to the display panel 1 by the source driver circuitry 14 to drive the display elements 6. The proximity sensing operation may involve obtaining sensing signals from the sensor electrodes 8 of the display panel 1 by the proximity sensing interface circuitry 16 and generating the capacitance detection data by performing an analog-digital conversion on the obtained sensing signals. In various embodiments, the obtained sensing signals may be one or more of integrated, filtered, demodulated, and base-lined to generate the capacitance detection data. The capacitive detection data may be utilized to determine positional information for an input object, e.g., the input object 140 within a sensing region, e.g., the sensing region 120.

In one or more embodiments, the register circuitry 20 is configured to store control parameters used for control of the operation of the processing system 2. At least one of the control parameters stored in register circuitry 20 may be used for controls of the display drive operation and the proximity sensing operation. The register circuitry 20 may be configured to be externally accessible via the interface circuitry 11.

Figure 4:
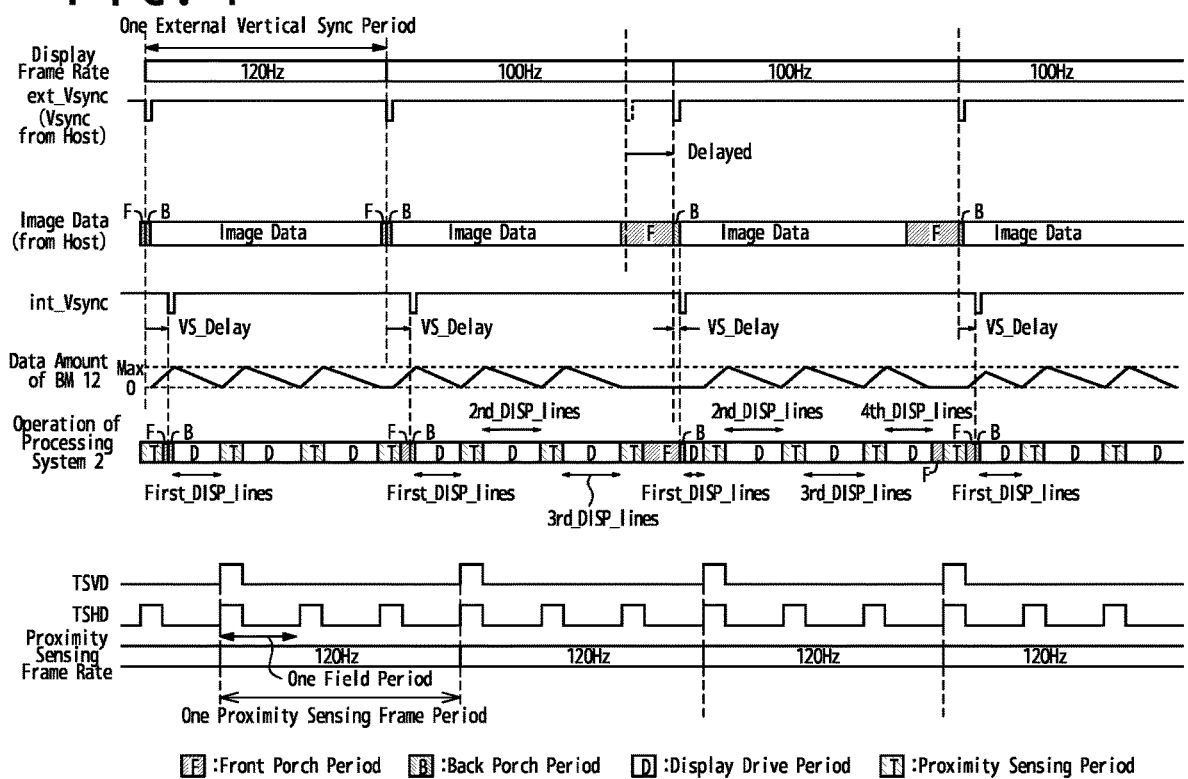
FIG. 4 illustrates an example operation of a display system, according to one or more embodiments.

In one or more embodiments, as illustrated in FIG. 4, vertical sync periods are defined in the operation of the input device 200 and a plurality of horizontal sync periods are further defined in each vertical sync period. Each vertical sync period may comprise a back porch period and a front porch period. The back porch period may be disposed at the beginning of the vertical sync period and the front porch period may be disposed at the end of the vertical sync period. Each of the back porch period and the front porch period may comprise a plurality of horizontal sync periods.

The start and end timings of vertical sync periods, back porch periods, and front porch periods may be different between the processing system 2 and the host 3. Accordingly, a vertical sync period, a back porch period, and a front porch period in the processing system 2 may be hereinafter referred to as internal vertical sync period, internal back porch period, and internal front porch period, respectively, and a vertical sync period, a back porch period, and a front porch period in the host 3 may be hereinafter referred to as external vertical sync period, external back porch period, and external front porch period, respectively, The start and end timings of horizontal sync periods may be different between the processing system 2 and the host 3. Accordingly, a horizontal sync period in the processing system 2 may be hereinafter referred to as internal horizontal sync period, and a horizontal sync period in the host 3 may be hereinafter referred to as external horizontal sync period.

In one or more embodiments, as illustrated in FIG. 4, the host 3 is configured to send a vertical sync period indicator, such as a Vsync packet, to the interface circuitry 11 of the processing system 2 at the beginning of an external vertical sync period. The timing controller 19 may be configured to assert the internal vertical sync signal int_Vsync to start an internal vertical sync period with a delay specified by a control parameter VS_Delay after the interface circuitry 11 receives the vertical sync period indicator. The control parameter VS_Delay may specify the number of external horizontal sync periods in a period between the reception of the vertical sync period indicator by the interface circuitry 11 and the start of the internal vertical sync period. In various embodiments, the interface circuitry 11 is configured to assert the external vertical sync detection signal ext_Vsync when receiving the vertical sync period indicator, and the timing controller 19 is configured to assert the internal vertical sync signal int_Vsync with a delay specified by the control parameter VS_Delay after the assertion of the external vertical sync detection signal ext_Vsync. In one or more embodiments, the assertion of the internal vertical sync signal int_Vsync may start an internal vertical sync period in the processing system 2.

An external back porch period may be disposed at the beginning of the external vertical sync period, and the host 3 may be configured to start transmitting image data to the processing system 2 when the external back porch period completes. The host 3 may be configured to transmit image data associated with one horizontal line of the display panel 1 to the processing system 2 in one external horizontal sync period. One horizontal line of the display panel 1 may comprise display elements 6 connected to one or more gate lines 4. The image data associated with all the horizontal lines of the display panel 1 may be transmitted to the processing system 2 in one external vertical sync period, and this may achieve transmitting the image data associate with one frame image to the processing system 2. The host 3 may start an external front porch period after the completion of the transmission of the image data. The external front porch period may continue until the start of a next external vertical sync period.

In one or more embodiments, an internal back porch period is disposed at the beginning of the internal vertical sync period, and the processing system 2 is configured to perform a display drive operation and a proximity sensing operation in a time division manner after the internal back porch period completes. An internal vertical sync period may comprise a plurality of display drive periods and the display drive operation may be performed in the plurality of display drive periods. The display drive periods are indicated by "D" in FIG. 4. The internal vertical sync period may comprise a plurality of proximity sensing periods and the proximity sensing operation may be performed in the plurality of proximity sensing periods. The proximity sensing periods are indicated by "T" in FIG. 4. The plurality of display drive periods and the plurality of proximity sensing periods may be alternatively disposed in the time domain.

In one or more embodiments, proximity sensing frame periods are defined independently of the internal vertical sync periods. Each proximity sensing frame period may comprise a plurality of field periods having the same length. Illustrated in FIG. 4 is the case where one proximity sensing frame period comprises three field periods. In one or more embodiments, each field period comprises one proximity sensing period. The period of each field period other than the proximity sensing period may comprise at least one of a display drive period, an internal back porch period and an internal front porch period. In one or more embodiments, the acquisition of sensing signals and generation of capacitance detection data for one proximity sensing period with respect to the entire display panel 1 are achieved during the plurality of field periods in one proximity sensing frame period.

The timing controller 19 may be configured to generate a proximity sensing frame start signal TSVD and a proximity sensing operation enable signal TSHD. The proximity sensing frame start signal TSVD may indicate a start of a proximity sensing frame period, and the proximity sensing operation enable signal TSHD may be used to enable the proximity sensing operation. The timing controller 19 may be configured to assert the proximity sensing start signal TSVD when starting a proximity sensing frame period. The length of one proximity sensing frame period may be identical to the periodicity of the proximity sensing frame start signal TSVD. In one or more embodiments, the proximity sensing operation enable signal TSHD is asserted during the proximity sensing periods, and the proximity sensing operation is performed while the proximity sensing operation enable signal TSHD is asserted. The length of one field period may be identical to the periodicity of the proximity sensing operation enable signal TSHD.

In one or more embodiments, the amount of the image data accumulated in the buffer memory 12 increases when image data is transmitted from the host 3 to the processing system 2 during a period during which the display drive operation is not performed. The period during which the display drive operation is not performed may comprise an internal back porch period, a proximity sensing period, and an internal front porch period. The amount of the image data accumulated in the buffer memory 12 may start increasing when a proximity sensing period is started while image data is being transmitted from the host 3 to the processing system 2. The timing at which the amount of the accumulated image data reaches a maximum amount in the buffer memory 12 may be the timing at which the proximity sensing period completes.

In one or more embodiments, when the display drive operation is started in a display drive period, the image data starts to be read out from the buffer memory 12 and the amount of the image data accumulated in the buffer memory 12 starts decreasing. The timing at which the amount of the accumulated image data becomes minimum may be the timing at which the display drive period completes.

In one or more embodiments, the input device 200 is configured to control the display frame rate. In various embodiments, the display frame rate corresponds to the lengths of the external vertical sync periods and the internal vertical sync periods and is controlled through controlling the lengths of the external vertical sync periods and the internal vertical sync periods. The display frame rate may be controlled by controlling the timing at which the vertical sync period indicators, such as Vsync packets, are transmitted from the host 3 to the processing system 2.

The display frame rate may be controlled by controlling the lengths of the external front porch periods. The display frame rate may be decreased by extending external front porch periods. For example, Illustrated in FIG. 4 is the case where the display frame rate is reduced from 120 Hz to 100 Hz by extending external front porch periods in the second and later external vertical sync periods. When an external front porch period is extended, the start timing of the next vertical sync period is delayed and therefore the start timing of the corresponding internal vertical sync period is also delayed in the processing system 2.

In one or more embodiments, the proximity sensing frame rate is maintained, e.g., kept constant or unchanged, while the display frame rate is variably controlled. Keeping the proximity sensing frame rate constant may effectively improve the accuracy of proximity sensing. The proximity sensing frame rate may be the number of proximity sensing frame periods per unit time, and the length of the proximity sensing frame periods may be kept constant when the proximity sensing frame rate is kept constant. Illustrated in FIG. 4 is the case where the proximity sensing frame rate is kept at 120 Hz.

In one or more embodiments, the positions of the proximity sensing periods in each internal vertical sync period are determined so that the proximity sensing frame rate is kept unchanged independently of the start timing of the internal vertical sync periods. This may be achieved by keeping the periodicity of the proximity sensing operation enable signal TSHD constant.

While image data is being transmitted to the processing system 2, the amount of the image data accumulated in the buffer memory 12 may increase during the proximity sensing periods. The maximum amount of the image data to be accumulated in the buffer memory 12 may increase depending on the positions of the proximity sensing periods in the internal vertical sync period. An overflow of the buffer memory 12 may occur when the maximum amount of the image data to be accumulated in the buffer memory 12 excessively increases.

In one or more embodiments, timing controls of the display drive operation and the proximity sensing operation are performed to reduce the maximum amount of the image data accumulated in the buffer memory 12. Such timing control may suppress or prevent an overflow of the buffer memory 12, preventing displaying an abnormal image on the display panel 1. The reduction in the maximum amount of the image data accumulated in the buffer memory 12 may be advantageous in terms of reduction in the capacity of the buffer memory 12.

In one or more embodiments, to reduce the maximum amount of the image data accumulated in the buffer memory 12, the leading display drive period is disposed before the leading proximity sensing period in the internal vertical sync period. The leading display drive period may be a first display drive period of the internal vertical sync period, and the leading proximity sensing period is a first proximity sensing period of the internal vertical sync period. This operation reduces the maximum amount of the image data accumulated in the buffer memory 12, since the amount of the image data accumulated in the buffer memory 12 decreases during the leading display drive period and this reduces the amount of the image data already accumulated in the buffer memory 12 at the beginning of the leading proximity sensing period. The timing control may be performed so that the length of the leading display drive period is made shorter than the lengths of the following display drive periods in the internal vertical sync period when the start timing of the internal vertical sync period is delayed.

In one or more embodiments, one or more control parameters used for timing controls of the display drive operation and the proximity sensing operation are further calculated based on input timing of a vertical sync period indicator, such as a Vsync packet, to the processing system 2 to decrease the maximum amount of the image data accumulated in the buffer memory 12. Such timing controls may suppress or prevent an overflow of the buffer memory 12. The thus-calculated control parameters may comprise control parameters VS_Delay and First_DISP_lines. The control parameter VS_Delay may specify the delay between the detection of the vertical sync period indicator and the start of the next vertical sync period. The control parameter First_DISP_lines may specify the number of horizontal lines of the display panel 1 for which drive signals are to be supplied to the display elements 6 of the display panel 1 during the leading display drive period of the next internal vertical sync period. The control parameter First_DISP_lines may be calculated based on the input timing of the vertical sync period indicator to the processing system 2, and the control parameter VS_Delay may be calculated based on the control parameter First_DISP_lines thus calculated.

Figure 5A:
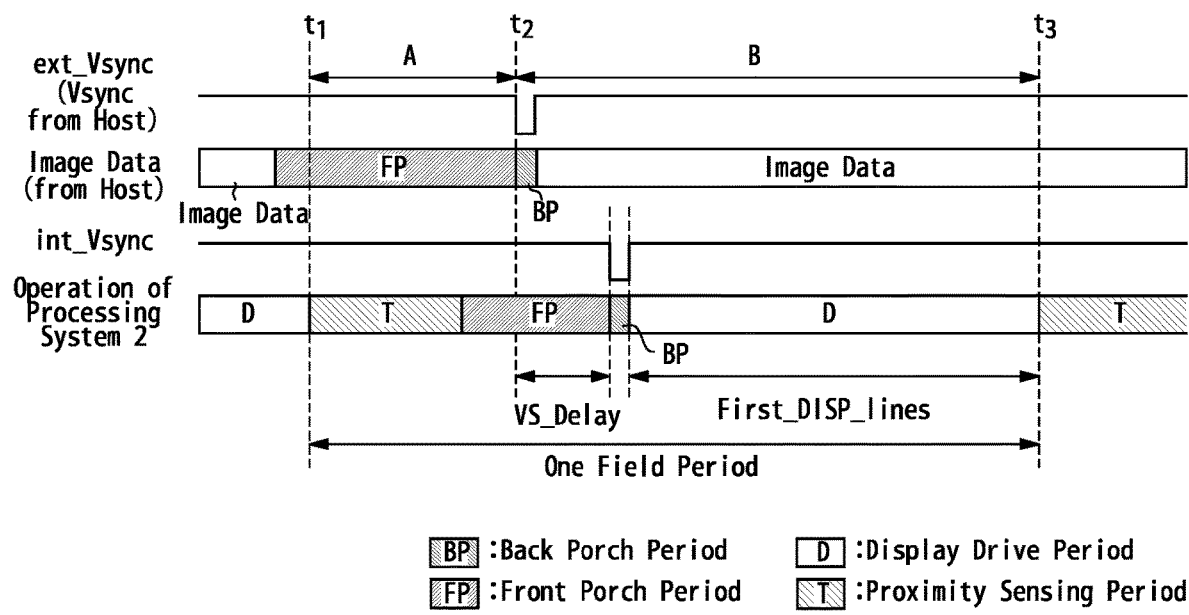
FIGS. 5A and 5B illustrate an example operation of a processing system, according to one or more embodiments.
Figure 5B:
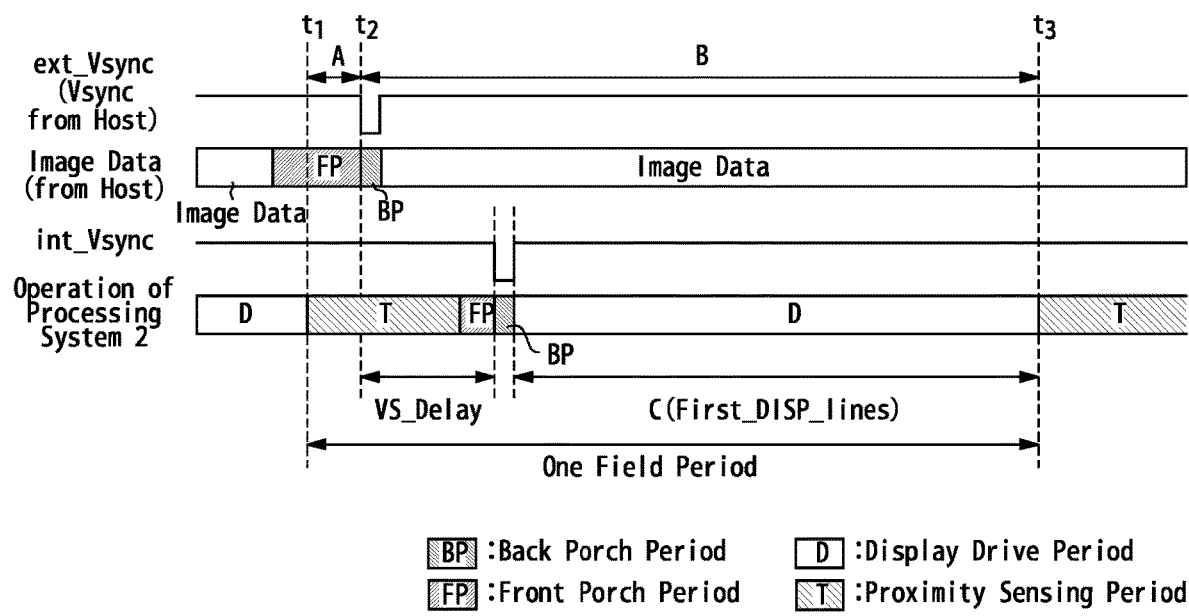

The input timing of the vertical sync period indicator may fall within a proximity sensing period as illustrated in FIG. 5A or not as illustrated in FIG. 5B. In one or more embodiments, for both the cases, the time duration B between the input of the vertical sync period indicator to the interface circuitry 11 and the start of the leading proximity sensing period in the next internal vertical sync period is calculated, and the control parameter First_DISP_lines is calculated based on the time duration B and the length of the horizontal sync periods ext_RTN in the host 3, where the control parameter First_DISP_lines specifies the number of horizontal lines for which drive signals are to be supplied to the display elements 6 thereof in the display drive operation during the leading display drive period.

In various embodiments, when a vertical sync period indicator is inputted to the interface circuitry 11 at time $t_2$, the time duration A between time $t_1$ and time $t_2$ is calculated, where time $t_1$ is the time when the latest proximity sensing period starts before time $t_2$. In this case, the time duration B between time $t_2$ and time $t_3$ when the next proximity sensing period starts may be calculated based on the time duration A. The time duration B may be calculated as the difference obtained by subtracting the time duration A from the length $L_{FIELD}$ of one field period in each proximity sensing frame period. More specifically, the time duration B may be calculated in accordance with the following equation (1):

$$B = L_{FIELD} - A. \tag{1}$$

The length $L_{FIELD}$ of one field period may be stored in the register circuitry 20 in the form of a register value.

In one or more embodiments, the length C of the leading display drive period is determined to be shorter than the time duration B, and the control parameter First_DISP_lines is determined based on the length C of the leading display drive period. The control parameter First_DISP_lines may be calculated by subtracting a predetermined value a from the number of external horizontal sync periods falling within the time duration B. The value a may be a predetermined natural number. The value a may be determined to avoid an underflow of the buffer memory 12 in the leading display drive period. The control parameter First_DISP_lines may be calculated in accordance with the following equation (2):

$$\text{First\_DISP\_lines} = B/\text{ext\_RTN} - \alpha, \tag{2}$$

where ext_RTN is the length of the external horizontal sync periods.

The length ext_RTN of the external horizontal sync periods, which appears in expression (2), may be detected by the Hsync detector 19b. The Hsync detector 19b may be configured to detect the length ext_RTN of the external horizontal sync periods by monitoring the external horizontal sync detection signal ext_Hsync. In alternative embodiments, the length ext_RTN of the external horizontal sync periods is fixed and stored in the register circuitry 20. In such embodiments, the control parameter First_DISP_lines may be calculated based on the length ext_RTN stored in the register circuitry 20.

In one or more embodiments, control parameters specifying the numbers of horizontal lines for which drive signals are to be supplied to the display elements 6 during the second and later display drive periods are calculated in addition to the control parameter First_DISP_lines. The control parameters specifying the numbers of horizontal lines for which drive signals are to be supplied to the display elements 6 during the second, third, and fourth drive periods may be hereinafter referred to as 2nd_DISP_lines, 3rd_DISP_lines, and 4th_DISP_lines, respectively.

Figure 6:
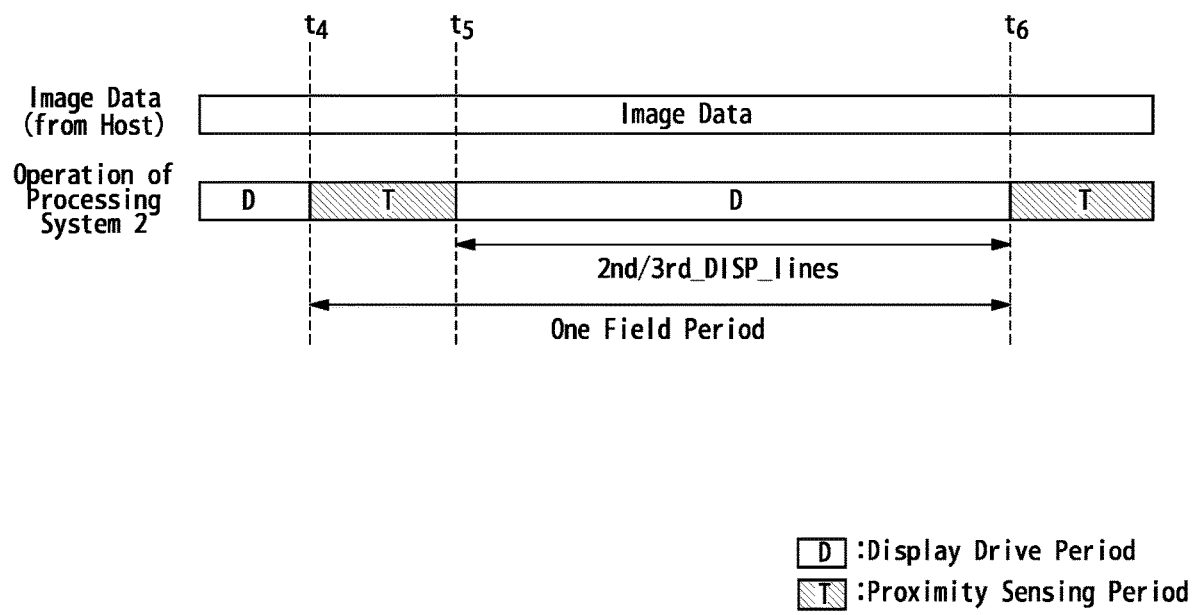
FIG. 6 illustrates an example operation of a processing system, according to one or more embodiments.

Referring to FIG. 6, in one or more embodiments, the numbers of horizontal lines for which drive signals are to be supplied to the display elements 6 thereof during the second and later display drive periods are calculated based on the number of external horizontal sync periods that fall within one field period. The numbers of horizontal lines for which drive signals are to be supplied to the display elements 6 during the second and later display drive periods other than the final display drive period may be calculated as the difference obtained by subtracting a predetermined value β from the number of external horizontal sync periods that fall within one field period. The final display drive period may be the last display drive period in an internal vertical sync period. The value β may be a predetermined natural number. When the internal vertical sync period of interest comprises four display drive periods, the control parameters 2nd_DISP_lines and 3rd_DISP_lines may be calculated in accordance with the following equation (3):

$$\text{2nd/3rd\_DISP\_lines} = L_{FIELD}/\text{ext\_RTN} - \beta, \tag{3}$$

where $L_{FIELD}$ is the length of one field period, and ext_RTN is the length of the external horizontal sync periods. When the length of the external horizontal sync periods ext_RTN is fixed, the number of horizontal lines for which drive signals are to be supplied to the display elements 6 during the second and later display drive periods other than the final display drive period may be a fixed value determined based on the length of one field period and the length ext_RTN of the external horizontal sync periods.

The number of horizontal lines for which drive signals are to be supplied to the display elements 6 thereof during the final display drive period may be calculated as the difference obtained by subtracting the sum of the numbers of the horizontal lines for which drive signals are to be supplied to the display elements 6 thereof during the preceding display drive periods from the total number of the horizontal lines of the display panel 1. When the internal vertical sync period of interest comprises four display drive periods, the control parameter 4th_DISP_lines, that is, the number of horizontal lines for which drive signals are to be supplied to the display elements 6 during the fourth display drive period may be calculated as the difference obtained by subtracting the sum of the numbers of the horizontal lines for which drive signals are to be supplied to the display elements 6 thereof during the first to third display drive periods from the total number of horizontal lines.

In one or more embodiments, the control parameter VS_Delay, that is, the delay between the detection of the vertical sync period indication and the start timing of the next internal vertical sync period is determined based on the difference obtained by subtracting the sum of the length C of the leading display drive period and the length $L_{BP}$ of the internal back porch period from the time duration B. The control parameter VS_Delay may be calculated as the number of external horizontal sync periods falling within a period between the detection of the vertical sync period start indicator and the assertion of the internal vertical sync signal int_Vsync. In this case, the control parameter VS_Delay may be calculated in accordance with the following equation (4):

$$\text{VS\_Delay} = \{B - (L_{BP} + C)\}/\text{ext\_RTN}. \tag{4}$$

The register circuitry 20 may store a register table that describes an association of the detection timing of the vertical sync period indicator with the values of the control parameters First_DISP_lines, 2nd_DISP_lines, 3rd_DISP_lines, 4th_DISP_lines, and VS_Delay. In such embodiments, the timing controller 19 may refer to the register table to select the control parameters First_DISP_lines, 2nd_DISP_lines, 3rd_DISP_lines, 4th_DISP_lines, and VS_Delay.

In one or more embodiments, the timing controls of the display drive operation and the proximity sensing operation are performed based on the control parameters VS_Delay, First_DISP_lines, 2nd_DISP_lines, 3rd_DISP_lines, and 4th_DISP_lines to thereby reduce the maximum amount of the image data stored in the buffer memory 12. The internal vertical sync signal int_Vsync may be asserted to start a next internal vertical sync period when external horizontal sync periods, the number of which is specified by the control parameters VS_Delay have elapsed after the detection of the input of a vertical sync period indicator to the processing system 2. The vertical sync period indicator may comprise a Vsync packet. In one or more embodiments, an internal back porch period is disposed at the beginning of the internal vertical sync period, and the leading display drive period starts when the internal back porch period completes. The leading display drive period may comprise internal horizontal sync periods, the number of which is specified by the control parameter First_DISP_lines. The number of horizontal lines for which drive signals are written into the display elements 6 thereof during the leading display drive period may be specified by the control parameter First_DISP_lines. In one or more embodiments, predetermined numbers of proximity sensing periods and display drive periods follow the leading display drive period, and the proximity sensing operation and the display drive operation are performed during the proximity sensing periods and the display drive periods, respectively. The second, third, and fourth display drive periods may comprise internal horizontal sync periods, the numbers of which are specified by the control parameters 2nd_DISP_lines, 3rd_DISP_lines, and 4th_DISP_lines, respectively. The numbers of the horizontal lines for which drive signals are written into the display elements 6 thereof during the second, third, and fourth display drive periods may be specified by the control parameters 2nd_DISP_lines, 3rd_DISP_lines, and 4th_DISP_lines, respectively.

In one or more embodiments, as illustrated in FIG. 7, the display frame rate is controlled by controlling the length of external horizontal sync periods of each external vertical sync period. The display frame rate may be reduced by increasing the length of external horizontal sync periods of each external vertical sync period. Illustrated in FIG. 7 is the case where the length of the external horizontal sync periods is increased in the second and later external vertical sync periods to reduce the display frame rate from 120 Hz to 100 Hz. When the display frame rate changes, the start timings of the internal vertical sync periods and the internal horizontal sync periods may accordingly change.

In one or more embodiments, the proximity sensing frame rate is kept constant even when the lengths of the external horizontal sync periods are variably controlled. Illustrated in FIG. 7 is the case where the proximity sensing frame rate is kept at 120 Hz. The positions of the proximity sensing periods in the time domain may be determined so that the proximity sensing frame rate remains unchanged regardless of the lengths of the external horizontal sync periods.

In one or more embodiments, image data associated with one horizontal line may be transmitted from the host 3 to the processing system 2 during one external horizontal sync period. In such embodiments, the transmission rate of the image data from the host 3 to the processing system 2 may decrease when the lengths of respective external horizontal sync periods are increased. The reduction in the transmission rate of the image data may cause a decrease in the amount of image data written into the buffer memory 12 per unit time. In one or more embodiments, timing controls of the display drive operation and the proximity sensing operation are performed to suppress or prevent an underflow of the buffer memory 12 potentially resulting from the decrease in the transmission rate of the image data to the processing system 2.

Since the amount of the image data accumulated in the buffer memory 12 may increase during a proximity sensing period as described above, the maximum amount of the image data to be accumulated in the buffer memory 12 may increase also in the operation illustrated in FIG. 7, depending on the positions of the proximity sensing periods in the internal vertical sync period. The timing controls of the display drive operation and the proximity sensing operation may be performed to suppress or prevent an overflow of the buffer memory 12 potentially resulting from the increase in the maximum amount of the image data to be accumulated in the buffer memory 12.

In one or more embodiments, to suppress or prevent an underflow and/or overflow of the buffer memory 12, the above-described control parameters VS_Delay and First_DISP_lines are calculated based on input timing of vertical sync period indicators, such as Vsync packets, to the processing system 2. The lengths ext_RTN of external horizontal sync periods may be further detected based on input timing of horizontal sync period indicators, such as Hsync packets, and the lengths int_RTN of internal horizontal sync periods may be controlled based on the detected lengths ext_RTN of the external horizontal sync periods. The lengths int_RTN of internal horizontal sync periods may be increased in accordance with the increase in the lengths ext_RTN of the external horizontal sync periods. This may reduce the amount of image data read out from the buffer memory 12 per unit time, suppressing or preventing an underflow of the buffer memory 12. Further, such timing control may prevent displaying an abnormal image on the display panel 1, which potentially results from an overflow and/or underflow of the buffer memory 12.

In one or more embodiments, also in the operation illustrated in FIG. 7, the time duration B between the input of the vertical sync period indicator to the interface circuitry 11 and the start of the leading proximity sensing period in the next internal vertical sync period is calculated, and the control parameter First_DISP_lines is calculated based on the time duration B and the lengths ext_RTN of the horizontal sync periods in the host 3 as described above in connection with FIGS. 4A and 4B, where the control parameter First_DISP_lines specifies the number of horizontal lines for which drive signals are to be supplied to the display elements 6 thereof in the display drive operation during the leading display drive period.

In various embodiments, when a vertical sync period indicator is inputted to the interface circuitry 11 at time $t_2$, the time duration A between time $t_1$ and time $t_2$ is calculated, where time $t_1$ is the time when the latest proximity sensing period starts before time $t_2$. In this case, the time duration B between time $t_2$ and time $t_3$ when the next proximity sensing period starts may be calculated based on the time duration A. The time duration B may be calculated in accordance with the above-described equation (1).

In one or more embodiments, the length C of the leading display drive period is determined to be shorter than the time duration B, and the control parameter First_DISP_lines is determined based on the length C of the leading display drive period, where the control parameter First_DISP_lines specifies the number of horizontal lines for which the display elements 6 are driven during the leading display drive period. The control parameter First_DISP_lines may be calculated by subtracting a predetermined value a from the number of external horizontal sync periods that fall within the time duration B, where a is a predetermined natural number. The control parameter First_DISP_lines may be calculated in accordance with the above-described equation (2), based on the lengths ext_RTN of the external horizontal sync periods detected by the Hsync detector 19b.

In one or more embodiments, the number of horizontal lines for which drive signals are to be supplied to the display elements 6 thereof during the second and later display drive periods other than the final display drive period are calculated as the difference obtained by subtracting a predetermined value β from the number of external horizontal sync periods that fall within one field period. The control parameters 2nd_DISP_lines and 3rd_DISP_lines may be calculated based on the length $L_{FIELD}$ of one field period and the lengths ext_RTN of the external horizontal sync periods detected by the Hsync detector 19b. The control parameters 2nd_DISP_lines and 3rd_DISP_lines may be calculated in accordance with the above-given equation (3). The number of horizontal lines for which drive signals are to be supplied to the display elements 6 thereof during the final display drive period may be calculated as the difference obtained by subtracting the sum of the numbers of the horizontal lines for which drive signals are to be supplied to the display elements 6 thereof during the preceding display drive periods from the total number of the horizontal lines of the display panel 1.

In one or more embodiments, the control parameter VS_Delay is calculated as the number of external horizontal sync periods that fall within a period between the detection of the vertical sync period start indicator and the assertion of the internal vertical sync signal int_Vsync. In this case, the control parameter VS_Delay may be calculated in accordance with the above-given equation (4).

The register circuitry 20 may store a register table that describes an association of the combination of the length ext_RTN of the external horizontal sync period detected by the Hsync detector 19b and the detection timing of the vertical sync period indicator with the values of the control parameters First_DISP_lines, 2nd_DISP_lines, 3rd_DISP_lines, 4th_DISP_lines, and VS_Delay. In such embodiments, the timing controller 19 may refer to the register table to select the control parameters First_DISP_lines, 2nd_DISP_lines, 3rd_DISP_lines, 4th_DISP_lines, and VS_Delay based on the detected length ext_RTN of the external horizontal sync period and the detection timing of the vertical sync period indicator.

In one or more embodiments, controlling the timing of the display drive operation and the proximity sensing operation is performed based on the control parameters VS_Delay, First_DISP_lines, 2nd_DISP_lines, 3rd_DISP_lines, and 4th_DISP_lines.

Although various embodiments of the present disclosure have been specifically described, a skilled person would appreciate that the technologies described in this disclosure may be implemented with various modifications.

What is claimed is:

1. A processing system, comprising:
   interface circuitry configured to receive a vertical sync period indicator that indicates a start of an external vertical sync period; and
   a timing controller configured to:
      start an internal vertical sync period based on the vertical sync period indicator, wherein the internal vertical sync period has a plurality of display drive periods within a frame during which a display drive operation is performed and a plurality of proximity sensing periods during which a proximity sensing operation is performed;
      control a delay between an input of the vertical sync period indicator and the start of the internal vertical sync period based on a length of a leading display drive period, wherein the length of the leading display drive period is made shorter than a length of at least one following display drive period in the internal vertical sync period; and
      in response to a change in a display frame rate, control timing of the display drive operation and the proximity sensing operation to maintain a proximity sensing frame based on input timing of the vertical sync period indicator,
   wherein the processing system is configured to supply drive signals to display elements of a display panel in the display drive operation and acquire sensing signals from sensor electrodes of the display panel in the proximity sensing operation.

2. The processing system according to claim 1, further comprises:
   a buffer memory configured to receive image data,
   wherein the display drive operation is based on the image data read out from the buffer memory, and
   wherein controlling the timing of the display drive operation and the proximity sensing operation comprises:
      controlling, based on the input timing of the vertical sync period indicator, a number of horizontal lines of the display panel for which the drive signals are supplied to the display elements in the display drive operation during the leading display drive period of the plurality of display drive periods of the internal vertical sync period.

3. The processing system according to claim 2, wherein the leading display drive period starts before a leading proximity sensing period of the plurality of proximity sensing periods.

4. The processing system according to claim 2, wherein controlling the timing of the display drive operation and the proximity sensing operation comprises:
   obtaining a first control parameter based on lengths of external horizontal sync periods, the first control parameter specifying the number of the horizontal lines for which the drive signals are supplied to the display elements in the display drive operation during the leading display drive period.

5. The processing system according to claim 4, wherein obtaining the first control parameter comprises:
   obtaining the first control parameter based on a first time duration between an input of the vertical sync period indicator and a start of a leading proximity sensing period of the plurality of proximity sensing periods in the internal vertical sync period.

6. The processing system according to claim 5, wherein a proximity sensing frame period comprises a plurality of field periods comprising the plurality of proximity sensing periods, respectively, and
   wherein controlling the timing of the display drive operation and the proximity sensing operation further comprises:
      calculating the first time duration based on a length of the plurality of field periods; and
      calculating a second time duration between a start of one of the plurality of proximity sensing periods and the input of the vertical sync period indicator.

7. The processing system according to claim 5, wherein the interface circuitry is configured to receive horizontal sync period indicators that indicate starts of the external horizontal sync periods,
   wherein the timing controller is configured to detect the lengths of the external horizontal sync periods based on the horizontal sync period indicators, and
   wherein obtaining the first control parameter comprises:
      obtaining the first control parameter based on the detected lengths of the external horizontal sync periods.

8. The processing system according to claim 7, wherein the changing of the display frame rate comprises changing the lengths of the external horizontal sync periods.

9. The processing system according to claim 8, wherein controlling the timing of the display drive operation and the proximity sensing operation comprises:

obtaining a second control parameter based on the detected lengths of the external horizontal sync periods, the second control parameter specifying a number of horizontal lines for which the drive signals are supplied to the display elements in the display drive operation during one of the plurality of display drive periods other than the leading display drive period.

10. The processing system according to claim 8, wherein, the timing controller is configured to, in response to a change in the display frame rate by a change in the lengths of the external horizontal sync periods, control lengths of internal horizontal sync periods in the processing system based on the lengths of the external horizontal sync periods.

11. The processing system according to claim 1, further comprising:
a buffer memory configured to receive image data,
wherein the display drive operation is based on the image data read out from the buffer memory, and
wherein controlling the timing of the display drive operation and the proximity sensing operation comprises:
controlling, based on the input timing of the vertical sync period indicator, the length of the leading display drive period of the plurality of display drive periods.

12. The processing system according to claim 11, wherein starting the internal vertical sync period comprises:
obtaining a second control parameter based on the length of the leading display drive period, the second control parameter specifies a number of external horizontal sync periods that fall between an input of the vertical sync period indicator and the start of the internal vertical sync period.

13. The processing system according to claim 12, wherein the interface circuitry is configured to receive horizontal sync period indicators that indicate starts of the external horizontal sync periods,
wherein the timing controller is configured to detect lengths of the external horizontal sync periods based on the horizontal sync period indicators, and
wherein obtaining the second control parameter comprises calculating the second control parameter based on the detected lengths of the external horizontal sync periods.

14. The processing system according to claim 1, wherein the delay between the input of the vertical sync period indicator and the start of the internal vertical sync period is variable between a plurality of vertical sync periods.

15. A display system, comprising:
a display panel comprising display elements and sensor electrodes; and
a processing system comprising:
interface circuitry configured to receive a vertical sync period indicator that indicates a start of an external vertical sync period; and
a timing controller configured to:
start an internal vertical sync period based on the vertical sync period indicator, wherein the internal vertical sync period has a plurality of display drive periods within a frame during which a display drive operation is performed and a plurality of proximity sensing periods during which a proximity sensing operation is performed;
control a delay between an input of the vertical sync period indicator and the start of the internal vertical sync period based on a length of a leading display drive period, wherein the length of the leading display drive period is made shorter than a length of at least one following display drive period in the internal vertical sync period; and
in response to a change in a display frame rate, control timing of the display drive operation and the proximity sensing operation to maintain a proximity sensing frame rate based on input timing of the vertical sync period indicator,
wherein the processing system is configured to supply drive signals to the display elements of the display panel in the display drive operation, and acquire sensing signals from the sensor electrodes of the display panel in the proximity sensing operation.

16. The display system according to claim 15, wherein the processing system further comprises:
a buffer memory configured to receive image data,
wherein the display drive operation is based on the image data read out from the buffer memory, and
wherein controlling the timing of the display drive operation and the proximity sensing operation comprises:
controlling, based on the input timing of the vertical sync period indicator, a number of horizontal lines of the display panel for which the drive signals are supplied to the display elements in the display drive operation during the leading display drive period of the plurality of display drive periods of the internal vertical sync period.

17. The display system according to claim 16, wherein the leading display drive period starts before a leading proximity sensing period of the plurality of proximity sensing periods.

18. The display system according to claim 15, wherein the processing system further comprises:
a buffer memory configured to receive image data,
wherein the display drive operation is based on the image data read out from the buffer memory, and
wherein controlling the timing of the display drive operation and the proximity sensing operation comprises:
controlling, based the input timing of the vertical sync period indicator, the length of the leading display drive period of the plurality of display drive periods.

19. A method, comprising:
receiving a vertical sync period indicator that indicates a start of an external vertical sync period by interface circuitry of a processing system;
starting an internal vertical sync period based on the vertical sync period indicator, wherein the internal vertical sync period has a plurality of display drive periods within a frame during which a display drive operation is performed and a plurality of proximity sensing periods during which a proximity sensing operation is performed;
controlling a delay between an input of the vertical sync period indicator and the start of the internal vertical sync period based on a length of a leading display drive period, wherein the length of the leading display drive period is made shorter than a length of at least one following display drive period in the internal vertical sync period; and
in response to a change in a display frame rate, controlling timing of the display drive operation and proximity sensing operation to maintain a proximity sensing frame rate based on input timing of the vertical sync period indicator to the interface circuitry,
wherein the display drive operation comprises suppling drive signals to display elements of a display panel, and wherein the proximity sensing operation comprises acquiring sensing signals from sensor electrodes of the display panel.

20. The method according to claim 19, further comprising:
storing image data in a buffer memory of the processing system,
wherein the display drive operation is based on the image data read out from the buffer memory,
wherein controlling the timing of the display drive operation and the proximity sensing operation comprises:
controlling, based on the input timing of the vertical sync period indicator, a number of horizontal lines of the display panel for which the drive signals are supplied to the display elements in the display drive operation during the leading display drive period of the plurality of display drive periods of the internal vertical sync period.

21. The method according to claim 19, further comprising:
storing image data in a buffer memory of the processing system,
wherein the display drive operation is based on the image data read out from the buffer memory,
wherein controlling the timing of the display drive operation and the proximity sensing operation comprises:
controlling, based on the input timing of the vertical sync period indicator, the length of the leading display drive period of the plurality of display drive periods.

22. The method according to claim 19, wherein the delay between the input of the vertical sync period indicator and the start of the internal vertical sync period is variable between a plurality of vertical sync periods.

* * * * *